(12) United States Patent
Kutschka

(10) Patent No.: US 6,206,157 B1
(45) Date of Patent: Mar. 27, 2001

(54) ROTATING DRIVING UNIT

(75) Inventor: Werner Kutschka, Augsburg (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 0 days.

(21) Appl. No.: 09/297,379

(22) PCT Filed: Sep. 8, 1998

(86) PCT No.: PCT/EP98/05689

§ 371 Date: Apr. 30, 1999

§ 102(e) Date: Apr. 30, 1999

(87) PCT Pub. No.: WO99/12700

PCT Pub. Date: Mar. 18, 1999

(30) Foreign Application Priority Data

Sep. 9, 1997 (DE) .............................. 197 39 511

(51) Int. Cl.⁷ .................................................. F16D 11/06
(52) U.S. Cl. ................... 192/18 A; 192/48.5; 192/87.16; 74/425; 74/665 C
(58) Field of Search ............................... 74/665 B, 665 C, 74/425, 330; 192/18 A, 48.5, 48.91, 87.16

(56) References Cited

U.S. PATENT DOCUMENTS

| | | | | |
|---|---|---|---|---|
| 2,938,397 | * | 5/1960 | Lemmetty | 74/330 |
| 2,995,069 | | 8/1961 | Wahlstrom et al. | |
| 2,995,950 | * | 8/1961 | Peras | 74/330 |
| 3,175,411 | * | 3/1965 | McFarland | 74/330 |
| 3,387,506 | * | 6/1968 | Cadiou | 74/330 |
| 3,744,608 | * | 7/1973 | Newman | 192/18 A |
| 3,887,290 | * | 6/1975 | Taylor | 403/370 |
| 4,211,313 | * | 7/1980 | Quick et al. | 192/18 A |
| 4,299,294 | * | 11/1981 | Womack | 173/148 |
| 4,546,664 | * | 10/1985 | Mylander | 74/330 |
| 4,548,101 | * | 10/1985 | Akashi et al. | 74/330 |
| 4,610,177 | * | 9/1986 | Mahoney | 74/330 |
| 4,644,819 | | 2/1987 | Zugel | 74/665 B |
| 4,738,149 | * | 4/1988 | Janiszewski | 74/330 |
| 4,753,130 | * | 6/1988 | Rode | 74/665 B |
| 5,456,344 | * | 10/1995 | Nellums | 192/18 A |
| 5,667,045 | * | 9/1997 | Cummings, III | 192/18 A |
| 5,806,641 | * | 9/1998 | Sommer | 192/18 A |

FOREIGN PATENT DOCUMENTS

| | | |
|---|---|---|
| 91 02 664 | 8/1992 | (DE) . |
| 0 454 530 | 10/1991 | (EP) . |
| 1 217 245 | 12/1970 | (GB) . |
| 2 067 943 | 8/1981 | (GB) . |

* cited by examiner

Primary Examiner—David A. Bucci
Assistant Examiner—Chong H. Kim
(74) Attorney, Agent, or Firm—Browdy And Neimark

(57) ABSTRACT

The invention relates to a rotary drive for a tool holding device with a shaft for bearing the holding device where the rotary drive performs both machining and milling using a common tool changing device. The inventor has a first hollow shaft (7) arranged concentrically to a shaft (1), the hollow shaft being driven by means of a drive device. Between the shaft (1) and the hollow shaft (7) and engageable and disengageable coupling (15 and 16) is arranged, which can. be operated by relative movement of the shaft (1) and the first hollow shaft (7). Between the shaft (1) and the first hollow shaft (7) a second hollow shaft (12) is arranged to cause such relative axial movement and rotatably bear the shaft (1). The first hollow shaft (7) is rotatably supported in a housing (5). Between the first hollow shaft (7) and the second hollow shaft (12) a gripping device is arranged, which couples with the second hollow shaft (12) when hollow shaft (7) is driven.

11 Claims, 1 Drawing Sheet

ROTATING DRIVING UNIT

CROSS REFERENCE TO RELATED APPLICATION

The present application is the national stage under 35 U.S.C. 371 of PCT/EP98/05689, filed Sep. 8, 1998.

BACKGROUND OF THE INVENTION

1. Technical Field of the Invention

The invention relates to a rotary drive for a tool holding device in accordance with the preamble of claim 1 herein.

2. Prior Art

Tool drives for lathes have to fulfill the requirement of operating at a relatively high speed of rotation and a relatively low torque. Tool drives for milling machines on the contrary have to fulfill the opposite requirement, i.e. operating at a relatively high torque and a low speed of rotation. In the case of machining centers, which combine a lathe and a milling machine, separate drives with separate tool changing devices are consequently provided for machining by turning and machining and milling.

OBJECT AND SUMMARY OF THE INVENTION

There is a need for a rotary drive which renders possible both machining by turning and machining by milling.

This object is to be achieved by the invention as described hereinafter.

BRIEF DESCRIPTION OF THE DRAWINGS

One working embodiment will now be described in the following with reference to the drawing, same showing a section taken through the top part of a rotary drive.

DETAILED DESCRIPTION OF THE PREFERRED EMBODIMENTS OF THE INVENTION

Figure 1:
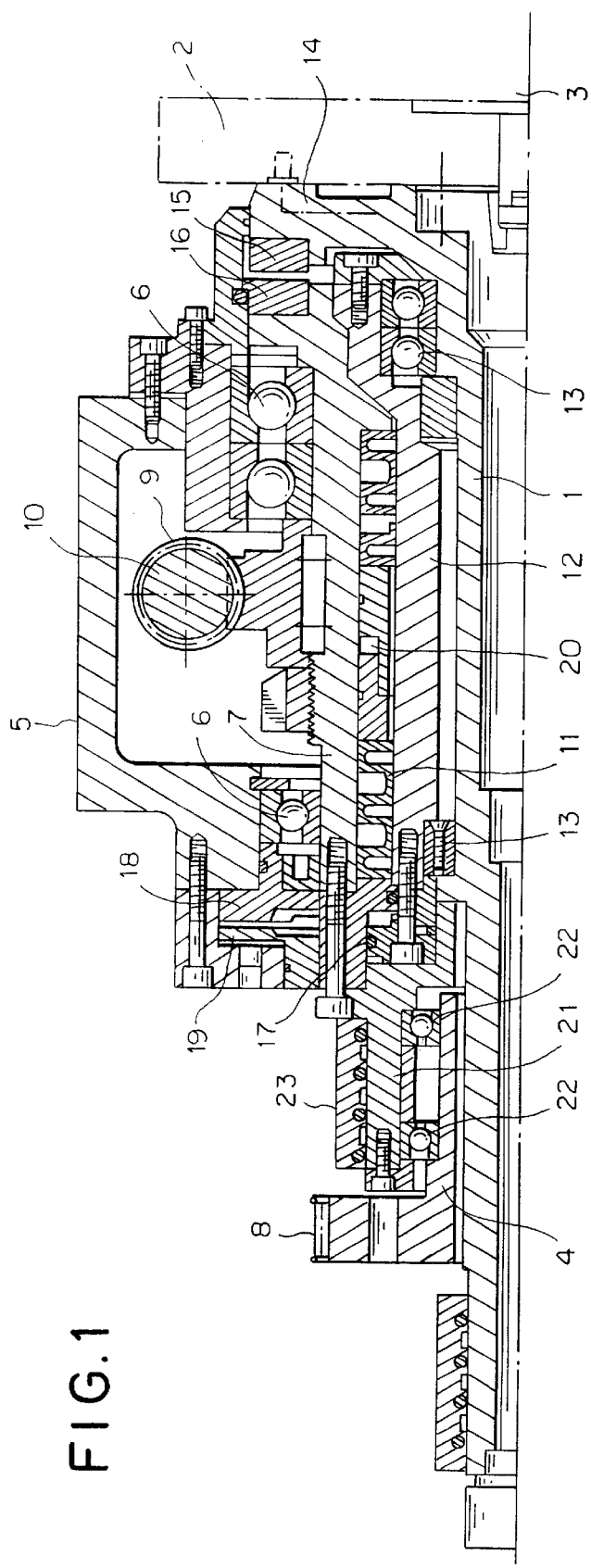

At its right hand end a shaft 1 bears an attachment flange 2, which for its part bears a tool holding device 3. On the left hand end of the shaft 1 a hollow shaft stub 4 is arranged, which is engaged by a drive device, something which is diagrammatically as indicated by the arrow 8. In the axial setting of the shaft 1 indicated the shaft 1 is uncoupled from the shaft stub 4.

By means of bearings 6 a housing 5 rotatably carries a hollow shaft 7. This hollow shaft 7 bears a worm wheel 9, which is in mesh with a worm 10. This worm 10 is rotatably borne by the housing 5 and is driven by a further drive device, not illustrated,. In the interior of the hollow shaft 7 a gripping quill 11 is arranged, which rotates with the hollow shaft 7. The gripping quill 11 surrounds a further hollow shaft 12, which by means of bearings 13 rotatably supports the shaft 1. The further hollow shaft 12 and the shaft 1 are able to be shifted jointly in the axial direction.

A flange 14 on the shaft 1 bears planar splines 15 which engage planar splines 16 on the right hand end of the hollow shaft 7.

The left hand end of the further hollow shaft 12 is designed in the form of a double acting cylinder 17, whose chambers are delimited by the hollow shaft 7. The hollow shaft 7 bears a brake disk 18 which cooperates with a brake pad 19 on the housing.

For the performance of machining by milling the shaft 1 and the hollow shaft 12 assume the axial setting indicated in the figure. In this case the splines 15 and 16 are in mesh with each other. The chamber 20 inside the gripping quill 11 is acted upon by pressure, and the chamber on the right of the cylinder 17 also. The shaft 1 and the shaft stub 4 are uncoupled from each other. If the worm 10 is caused to rotate, the attachment flange 2 will turn as well and consequently the tool holding device 3 as well relatively slowly, but with a high torque. The shaft 1, the hollow shaft 12 and the shaft 7 will rotate jointly, the gripping quill 11 being responsible for gripping engagement between the two hollow shafts 7 and 12. If the worm 10 is halted, the brake pad 19 or jaw will come into engagement with the brake disk 18. The shafts are rotatably carried by the bearings 6.

If machining by turning is to be performed, the worm is halted. The chamber on the left of the cylinder 17 is put under pressure, whereas the right hand chamber, like the chamber 20, is relieved of pressure. As a result the further hollow shaft 12 will perform an axial movement to the right. Since the further hollow shaft 12 is connected with the shaft 1 in an axially movable manner via the bearings 13, the shaft 1 will perform the same axial movement. The splines 15 and 16 come out of engagement with each other, whereas the shaft 1 is connected with the shaft stub 4 for the transmission of rotary force. If now the drive 8 is operated, the attachment flange 2 and the tool holding device 3 will rotate at a relatively high speed so that turning operations, i.e. machining by turning, are possible. When the hollow shaft 7 is not rotating, the brake pad 19 is applied to the brake disk 18.

For the supply of the chambers on either side of the cylinder 17 and the chamber 20, the hollow shaft 7 possesses a hollow shaft head 21, which with the aid of bearings 22 rotatably supports the shaft stub 4 and is surrounded by a head 23 on the housing, such head cooperating with the shaft head 21 like a slip ring and has hydraulic ports. Such ports are connected via hydraulic connections 24 with the above mentioned chambers.

What is claimed is:

1. A rotary drive for a tool holding device (3) comprising:
   a shaft (1) adapted to bear the holding device (3);
   a first hollow shaft (7) arranged concentrically over the shaft (1);
   the first hollow shaft adapted to be driven by means of a drive device;
   an engageable and disengageable coupling (15, 16) arranged between the shaft (1) and the first hollow shaft (7);
   the coupling operated by relative axial movement between the shaft (1) and the first hollow shaft (7);
   a second hollow shaft (12) arranged between the shaft (1) and the first hollow shaft, adapted to cause the relative axial movement and to rotatably bear the shaft (1);
   the first hollow shaft (7) rotatably supported in a housing (5);
   a gripping device arranged between the first hollow shaft (7) which when the hollow shaft (7) is driven couples with the second hollow shaft (12);
   and wherein the first hollow shaft (7) is rotatably mounted in the housing (5) in a manner preventing axial movement when the second hollow shaft (12) axially shifts the shaft (1).

2. The rotary drive as claimed in claim 1, characterized in that between the first hollow shaft (7) and the housing (5) a brake (18 and 19) is provided, which to operates when the first hollow shaft (7) is not rotating.

3. The rotary drive as claimed in claim 1, characterized in that the first hollow shaft (7) and the second hollow shaft (12) are designed in the form of a double acting piston.

4. The rotary drive as claimed in claim 1, characterized in that the part, adjacent to the second hollow shaft (12), of the first hollow shaft (7) is designed in the form of a hydraulically operated gripping quill (11).

5. The rotary drive as claimed in claim 4, characterized in that a shaft head (21) on the first hollow shaft (7) and a housing head (23) cooperate in the manner of a slip ring arrangement and have the hydraulic connections to the double acting piston and the gripping quill (11).

6. The rotary drive as claimed in claim 5, characterized in that the head (21) on the first hollow shaft (7) rotatably supports a shaft stub (4) able to be coupled with the shaft (1), such shaft stub (4) being coupled with the shaft (1) in one axial setting thereof and in another axial setting thereof being uncoupled from the shaft (1) and being acted upon by a drive device (8).

7. A rotary drive for a tool holding device (3) comprising:

a shaft (1) adapted to bear the holding device (3);

a first hollow shaft (7) arranged concentrically over the shaft (1);

the first hollow shaft adapted to be driven by means of a drive device; an engageable and disengageable coupling (15, 16) arranged between the shaft (1) and the first hollow shaft (7);

the coupling operated by relative axial movement between the shaft (1) and the first hollow shaft (7);

a second hollow shaft (12) arranged between the shaft (1) and the first hollow shaft, adapted to cause the relative axial movement and to rotatably bear the shaft (1);

the first hollow shaft (7) rotatably supported in a housing (5);

a gripping device arranged between the first hollow shaft (7) which, when the hollow shaft (7) is driven, couples with the second hollow shaft (12);

wherein the first hollow shaft (7) is rotatably mounted in the housing (5) in a manner preventing axial movement when the second hollow shaft (12) axially shifts the shaft (1) and, a brake (18 and 19) arranged between the first hollow shaft (7) and the housing (5) which operates when the first hollow shaft (7) is not rotating.

8. The rotary drive as claimed in claim 7 wherein, the first hollow shaft (7) and the second hollow shaft (12) are designed in the form of a double acting piston.

9. A rotary drive for a tool holding device (3) comprising:

a shaft (1) adapted to bear the holding device (3);

a first hollow shaft (7) arranged concentrically over the shaft (1);

the first hollow shaft adapted to be driven by means of a drive device; an engageable and disengageable coupling (15, 16) arranged between the shaft (1) and the first hollow shaft (7);

the coupling operated by relative axial movement between the shaft (1) and the first hollow shaft (7);

a second hollow shaft (12) arranged between the shaft (1) and the first hollow shaft, adapted to cause the relative axial movement and to rotatably bear the shaft (1);

the first hollow shaft (7) rotatably supported in a housing (5);

a gripping device arranged between the first hollow shaft (7) which, when the hollow shaft (7) is driven, couples with the second hollow shaft (12);

wherein the first hollow shaft (7) is rotatably mounted in the housing (5) in a manner preventing axial movement when the second hollow shaft (12) axially shifts the shaft (1), and wherein, adjacent to the second hollow shaft (12), the first hollow shaft (7) is designed in the form of a hydraulically operated gripping quill (11).

10. The rotary drive as claimed in claim 9, wherein, a shaft head (21) on the first hollow shaft (7) and a housing head (23) cooperate in the manner of a slip ring arrangement and have hydraulic connections to the double acting piston and the gripping quill (11).

11. The rotary drive as claimed in claim 9, wherein the head (21) on the first hollow shaft (7) rotatably supports a shaft stub (4) which can be coupled with the shaft (1), the shaft stub (4) being coupled with the shaft (1) in one axial setting of the shaft (1) and in another axial setting of the shaft (1) being uncoupled from the shaft and being acted up on by a drive device (8).

\* \* \* \* \*